PRECISION CATHODE RAY TUBE SCANNER WITH REFERENCE GRID NETWORK

Filed Jan. 15, 1968 2 Sheets-Sheet 1

INVENTOR
RICHARD G. GRAY
BY Thomas & Thomas
ATTORNEYS

United States Patent Office 3,566,353
Patented Feb. 23, 1971

3,566,353

PRECISION CATHODE RAY TUBE SCANNER WITH REFERENCE GRID NETWORK

Richard G. Gray, West Hurley, N.Y., assignor to International Business Machines Corporation, Armonk, N.Y., a corporation of New York Filed Jan. 15, 1968, Ser. No. 697,736
Int. Cl. G06k 9/00
U.S. Cl. 340—146.3 12 Claims

ABSTRACT OF THE DISCLOSURE

A cathode ray tube with a light emitting coating on its face is illuminated by an electron beam selectively controlled to scan any desired pattern on the face of the cathode ray tube, a document disposed in the path of the light emitted from the face of the CRT, a light responsive device responsive to light passing through the document to detect a change in light intensity thereby to indicate that a point on the character has been detected, an opaque grid pattern disposed on the inner face of the cathode ray tube, another light responsive device disposed to receive light directly from the light emitting face of the cathode ray tube and sense changes of intensity created as the electron beam crosses any segment of the opaque grid pattern, and circuit means responsive to the first and second light responsive devices to provide signals which are used to locate a detected point on a character with respect to the grid pattern.

BACKGROUND OF THE INVENTION (1) This invention relates to a device for reading special characters, symbols, vectors, geometrical designs, and the like and more particularly such devices for precisely defining the location of points which constitute such special characters and symbols.

(2) In earlier types of devices which use a cathode ray tube scanner to read information from transparent, translucent or opaque documents, drawings or photographs, it is essential that very precise circuit components be employed if a high degree of accuracy is to be obtained in positioning the electron beam. The errors in the analog positioning control signals represent a summation of the drifts and errors in the analog driving circuitry as well as in the cathode ray tube power supplies. Fixed value errors in such systems can be overcome by system alignment, but time-dependent changes in the circuit components cannot usually be detected. The accuracy with which an electron beam might be controlled or positioned is a function of the precision of the components employed in the analog control circuits, and with the high precision components accuracies of about ±1% are the best yet to be obtained. The addition of a calibration pattern, optically in coincidence with the image to be measured, might be provided to obtain greater accuracy, but this involves the addition of lenses and beam splitters in combination with the reference or calibration pattern. Such techniques, however, are costly. Moreover, there are many instances where still greater accuracy of beam position control is required in a cathode ray tube scanner. It is highly desirable to provide such increased accuracy in locating the points which define a special character without requiring costly equipment and it is to this problem that the present invention is directed.

SUMMARY OF THE INVENTION

It is a feature of this invention to provide an improved device for reading characters with a cathode ray tube scanner which includes a grid or other calibration pattern disposed on the inner face of the cathode ray tube, preferably in intimate contact with the light emitting material on the face of the cathode ray tube, whereby the grid pattern serves to modify the intensity of the light emanating from the face of the cathode ray tube by an amount sufficient to permit detection by a light responsive device which, in combination with other equipment, keeps track of the number of crossings the electron beam makes over the grid pattern. These crossings serve as bench marks which may be used for precisely determining the position of the electron beam. When points on a vector or other geometric configuration are detected, the location of such detected points with respect to the grid pattern can be accurately defined.

It is another feature of this invention to provide an improved character reader which uses a grid pattern on the inner glass face of a cathode ray tube, and the grid pattern is etched thereon and filled with an opaque material.

It is yet another feature of this invention to provide such a grid pattern on the inner face of a cathode ray tube by evaporating an aluminum layer on the inner face of the light emitting material of the cathode ray tube.

It is a further feature of this invention to provide an improved device for reading special characters which utilizes a grid pattern on the inner face of a cathode ray tube for the purpose of defining precisely with accuracies of about 0.01% the position of the electron beam during character reading operations.

It is a still further feature of this invention to provide an improved character reading device for precisely determining the position of an electron beam in a cathode ray tube when reading characters by providing a grid pattern disposed between the electron beam and the light emitting material on the face of the cathode ray tube.

The foregoing and other objects, feaures and advantages of the invention will be apparent from the following more particular description of a preferred embodiment of the invention, as illustrated in the accompanying drawings.

DESCRIPTION OF THE PREFERRED EMBODIMENT

Figure 1:
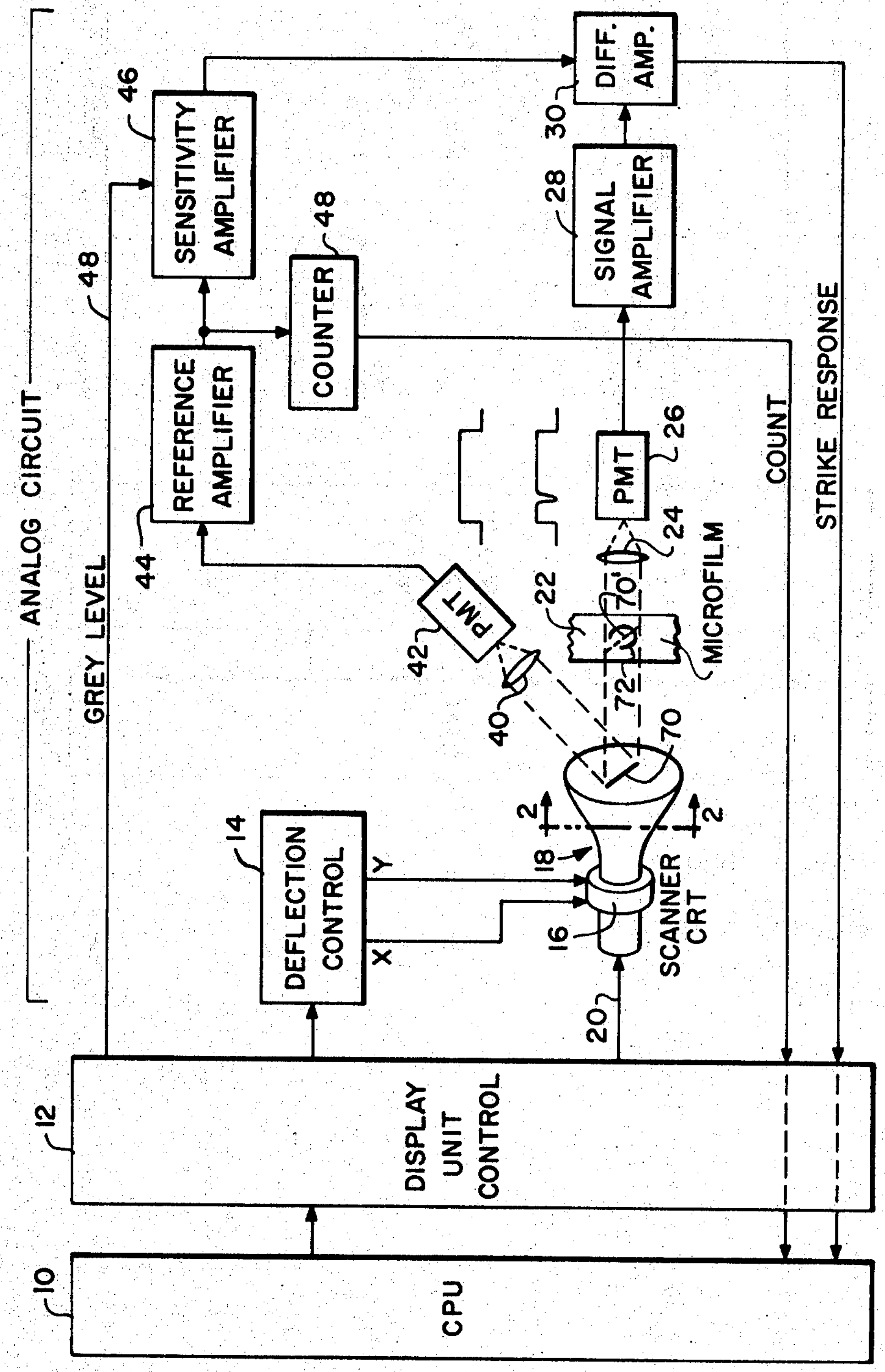
FIG. 1 is a system which illustrates the principles of the present invention.

Reference is made to FIG. 1 for a system arrangement which illustrates the principles of the present invention. A central processing unit (CPU) 10 serves to collect data, process the data, and supply answers and control signals in response thereto for various other devices which may include, for example, other display devices not shown. The CPU 10 supplies control information to a display unit control 12, and the CPU receives data from the display unit control 12. The display unit control 12 operates a deflection control 14 which in turn provides X and Y control signals to a deflection control device 16 of a cathode ray tube (CRT) 18. The display unit control 12 supplies signals on a line 20 to blank or unblank the CRT 18, A microfilm strip 22 is disposed to receive light generated on the face of the CRT 18. Light passing through the microfilm strip 22 passes through a collecting lens 24 to a photomultiplier tube (PMT), and its output is supplied to a signal amplifier 28. The output of the signal amplifier 28 is connected to a differential amplifier 30, and its output in turn is connected to the display unit control 12. The display unit control 12 forwards data from the differential amplifier 30 to the CPU 10 for processing and control purposes.

Light from the face of the CRT 18 passes also through a collecting lens 40 to a photomultiplier tube 42, and its output is supplied to a reference amplifier 44. The output of the reference amplifier 44 is supplied to a sensitivity amplifier 46. Signals from the reference amplifier 44 represent bench marks, and as explained more fully hereinafter, they are used to define precisely detected points of characters and geometrical configurations on the microfilm strip 22. The sensitivity amplifier 46 receives a control signal on a line 48 from the display unit control 12, and this control signal establishes the gray level for a given microfilm strip. This control signal is used to modify the sensitivity of the amplifier 46 depending upon the variation of the light and dark areas of the microfilm strip 22. The microfilm strip is preferably a negative, and such film strips may be lighter or darker depending upon the exposure time, the lens opening and the film sensitivity employed. If a given film strip is very light and the photographed image is rather faint, the sensitivity of the amplifier 46 must be greater in order to distinguish the faint image from its background. On the other hand, the sensitivity of the amplifier 46 is reduced where the microfilm strip has a very dark background and the image is very light and well defined, thereby providing a brilliant contrast with its dark optical background. The output of the sensitivity amplifier likewise represents bench marks, and its output is supplied to the differential amplifier 30. When the output of the sensitivity amplifier 46 is the same as the output of the signal amplifier 28, this indicates that the photomultipliers 26 and 42 receive the same light intensity, and an image is not detected. In this case the differential amplifier 30 does not supply useful signals to the display unit control 12. If the sensitivity amplifier 46 and the signal amplifier 28 have outputs which differ, this signifies that the image on the microfilm strip 22 modifies the intensity of the light supplied to the photomultiplier tube 26, and the difference signal from the output of the differential amplifier 30 signifies the detection of a point on the image of the microfilm strip. This information and information signifying the location of the point in terms of the bench marks are supplied through the display unit control 12 to the CPU 10. If enough points of an image and the location of such points are supplied to the CPU 10, it is able to process this information and determine the precise configuration of the image on the microfilm strip 22.

The output of the reference amplifier 44 represents bench marks as pointed out above. A counter 48 responds to such signals representing bench marks from the reference amplifier 44, and it is incremented in response thereto. The content of the counter 48, representing positional data in terms of bench marks, is read by the display unit control 12 and supplied to the CPU 10 for its calculations and control processing. Various CPU program techniques may be employed to determine precisely the location of detected points on the image of the microfilm strip 22, and one of these techniques is covered in detail subsequently.

A grid network is disposed on the inner face of the CRT 18 for the purpose of providing bench marks by interrupting the electron beam. The grid network changes the intensity of the light emitted from the face of the CRT 18, and this change in light intensity is detected by the photomultiplier tube 42 which in turn changes the output of the reference amplifier 44 to operate the counter 48 and the sensitivity amplifier 46.

Figure 2:
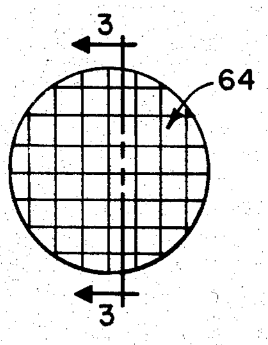
FIG. 2 is a view taken on the line 2—2 in FIG. 1 and it illustrates one type of grid pattern which may be used in the present invention.

FIG. 2 is a view taken on the line 2—2 in FIG. 1, and it is a rear view of the face plate of the CRT 18 showing one arrangement of a grid network. The grid network in FIG. 2 includes horizontal and vertical strips disposed as shown on the inner face of the CRT 18. The grid element may be metallic strips placed on the phosphorous emitting layer. The metallic strips may be aluminum, for example, which is installed by vapor deposition or other technique.

Figure 3:
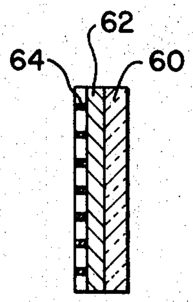
FIG. 3 is a cross sectional view taken on the line 3—3 in FIG. 2, and it shows the arrangement of the grid pattern with respect to the coating of light emitting material and the glass face plate of a cathode ray tube.
Figure 4:
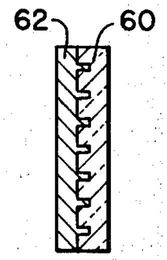
FIGS. 4 and 5 show alternative arrangements for constructing a grid pattern according to the present invention.

FIG. 3 is a cross sectional view taken on the line 3—3 in FIG. 2, and it shows the glass face 60 of the CRT 18 with a light emitting layer 62 disposed against the glass face 60. The grid network, designated by the numeral 64, is disposed adjacent to the light emitting surface 62. A cross sectional view of an alternative arrangement is shown in FIG. 4 where the grid network is etched into the glass surface 60, and the light emitting material, such as phosphorous compounds, is disposed against the glass face 60 and fills the etched portions of the glass face. It is readily seen that at the grid lines the thickness of the phosphorous compounds is much greater than its thickness between grid lines. The additional thickness of the phosphorous compound is sufficient to change the light intensity to operate the photomultiplier tube 42 to generate bench mark signals.

Figure 5:
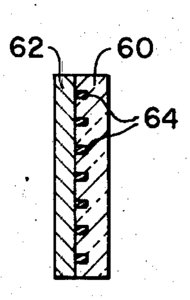

A cross sectional view of still another alternative arrangement is shown in FIG. 5 where the grid network again is etched into the glass surface 60, and opaque material, other than the phosphorous compounds, is deposited against the face 60 and fills the etched portions of the glass face. Thus it is readily seen that the opaque material constituting the grid network 64 in FIG. 5 serves to diminish the intensity of the light generated by the electron beam as it crosses any element of the grid network. It is pointed out that the grid network may be disposed on either side of the light emitting coating, but it is preferred to have the grid network disposed between the electron beam and the light emitting coating.

Next, the operation of the system arrangement in FIG. 1 is described. The microfilm 22 is placed in position, and the CRT is manipulated by the CPU 10, under program control, to generate scan lines, referred to hereinafter as scan vectors. Enough scan vectors are generated on the face of the CRT 18 to interrogate the entire surface of the microfilm under investigation. When a point on the image is detected, referred to hereinafter as a strike, the bench marks indicated by the counter 48 can be used to determine in which block of the grid network the strike occurred. The precise location of the strike within a given block of the grid network can be determined by the CPU 10 if the scan vector which produced the strike is repeated or regenerated. More specifically, the general scan pattern is not interrupted unless a strike is detected. When a strike is detected, it is signified by a signal from the differential amplifier 30 which is supplied through the display unit control 12 to the CPU 10. The signal from the differential amplifier 30 is used by the display unit control 14 to signal it to read the content of the counter 48. With this information supplied to the CPU 10, it determines (1) that a strike has occurred, calling for a cessation of the general scan pattern, and (2) a precise measurement should be made in the block of the grid pattern in which the strike occurred. When a strike is detected, the X, Y coordinates of the block in the grid pattern surrounding the strike, are extracted from memory, and one point on the designated block is used as a point of beginning or reference point. The problem then is to determine an incremental X value and an incremental Y value which may be added to or subtracted from such reference coordinates to determine the precise X, Y coordinates of the strike. For this purpose a time measuring device, which may take the form of a counter, is employed in the display unit control 12 or the CPU 19 to measure the transit time of the scan vector across the block in which the strike occurred. With this information the CPU 10 is able to interpolate and precisely fix the location of the strike. The counter in the display unit control, not shown, is turned on as soon as the strike vector encounters the side of the grid block in which the strike occurred, and the counter content is read out when the strike point is reached. The counter continues to run until the other side of the block is reached at which point it is turned off. The total counter value across the box in question and the angle of the scan vector can be used to calculate the incremental values of X and Y for precisely determining the strike point in the block. One way this may be done is discussed in greater detail below.

Figure 6:
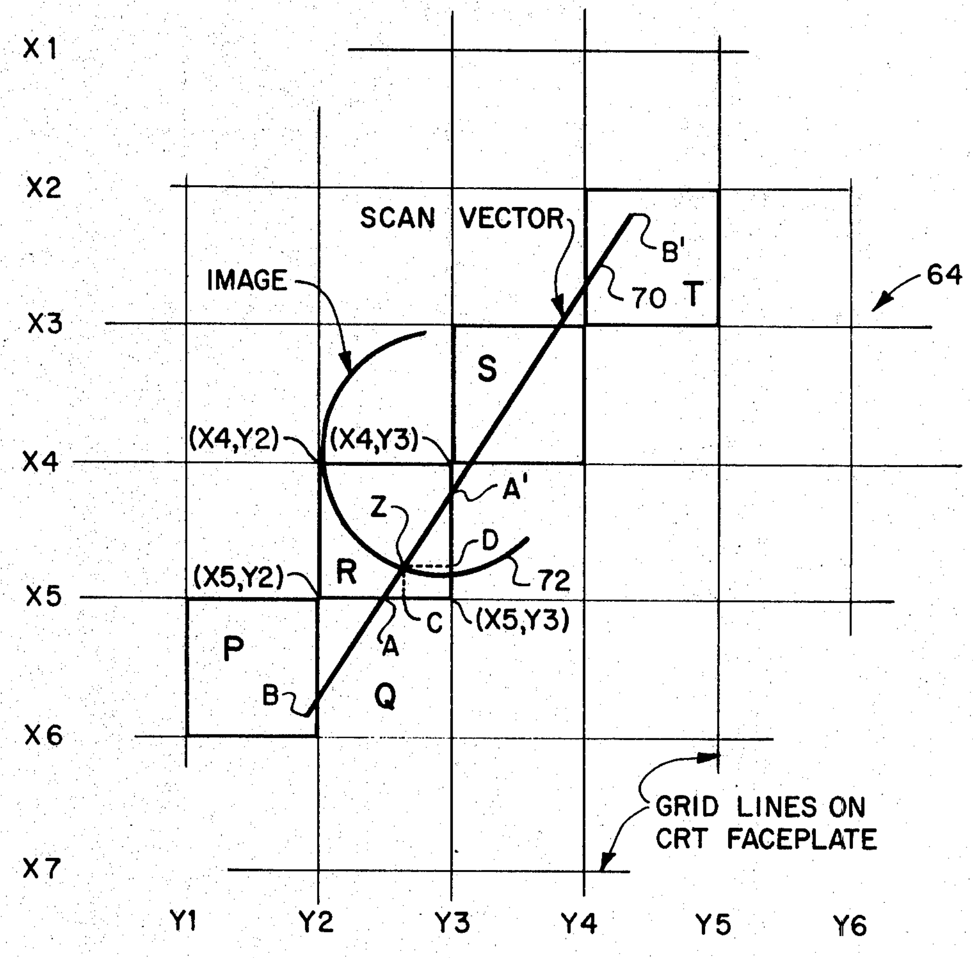
FIG. 6 is useful in explaining the invention, and it shows a grid pattern, an image and a scan vector which are superimposed to facilitate an understanding of the principles of this invention.

FIG. 6 is a composites view of the grid network 64, a scan vector 70 and an image 72 which are superimposed for the purpose of more clearly explaining how the grid pattern serves to locate precisely detected points of an image. The superimposed arrangement in FIG. 6 is a view looking from the position of the lens 24 in FIG. 1. The image 72 is on the microfilm strip 22. The scan vector represents the path followed by the electron beam of the CRT 18. The grid pattern shows where bench marks are generated as the beam of the flying spot scanner traverses the path shown in FIG. 6. FIG. 6 is useful in explaining how one strike is handled. It should then be readily apparent how the strikes are detected and processed to determine all points on an image.

The location and generation of the scan vector is controlled by the CPU 10. It manipulates the display unit control 12 which in turn operates the deflection control 14 to generate the scan vector between points B and B′, and it supplies a control signal on the line 20 in FIG. 1 to unblank the electron beam as it travels between the points B and B′. The grid network 64 is stationary at all times, and the film strip remains in a stationary position while it is being scanned.

Before any image scanning operation takes place, the X and Y coordinate points of the entire grid pattern 64 are measured and stored in the CPU memory or an auxiliary memory. This is easily accomplished because the spacial position of the horizontal and vertical lines of the grid pattern can be accurately determined. The vertical and horizontal lines of the grid pattern can be accurately determined. The vertical and horizontal lines of the grid pattern are marked off in precise increments. Once the X and Y coordinate points of the grid pattern are measured and stored, this information can be used indefinitely since the measurements of the grid pattern are fixed and do not change. Only if the stored information is destroyed would the grid pattern coordinates have to be measured again.

In order to illustrate more specifically how strikes are processed, let it be assumed that the scan vector 70 in FIG. 6 results from a general scan pattern dictated by the CPU 10 under program control. In this connection it is pointed out that numerous vectors might be generated which do not produce a strike response, but such vectors do not produce an output from the differential amplifier 30. Consequently, such scan vectors are useful to eliminate areas on the microfilm from further consideration because such areas do not contain a portion of the image. Customarily, numerous scan vectors may be generated before a strike is found on the microfilm. The scan vector 70 in FIG. 6 is arbitrarily selected to illustrate the steps to be followed after a strike is detected.

As pointed out earlier the scan vector 70 is controlled in its generation from the point of origin B to the point of termination B′. Thus the slope of the vector is available in the CPU 10. If a strike is detected, the CPU 10 under program control can readily detect that the strike lies in one of the blocks P, Q, R, S or T. Each of the coordinate points which define these boxes are available in the memory as pointed out earlier. The point B of the scan vector is known because the CPU starts the scan vector in the block P, and this block can be eliminated as soon as the bench mark Y2 is detected since no strike is generated at that time. The next bench mark is generated when the scan vector crosses the grid line X5 which is defined by the point A. The box Q is then eliminated because no strike signal is generated as the scan vector traverses its path through the block Q. As the scan vector traverses its course through block R a strike signal is generated as it crosses the image at point Z. Since the slope of the scan vector is known, because its generation is controlled by the CPU, the program of the CPU 10 can determine that the strike occurred in block R. However, in order to determine the precise location of the point Z in block R, it is necessary to repeat the generation of the scan vector 70 using the counter, now shown, in the display unit control 12 or the CPU 10 to interpolate for incremental values of X and Y which are added to a set of X, Y reference coordinates at one corner of the block R. The lower left hand corner of the block R is arbitrarily selected to illustrate the technique. The reference coordinates thus are X5, Y2. It is pointed out that the strike point Z is defined within the block R by an incremental value of X which is between X4 and X5 and an incremental value of Y which is between Y2 and Y3. As the scan vector 70 is generated a second time, it crosses the box R on both the X and the Y axes. The synchronized digital counter or other time measuring device, not shown, disposed in the display unit control 12 or the CPU 10 is synchronized to the velocity of the scan line. This counter is started when one side of the box R is encountered. This is easily accomplished by the CPU 10 since the value in the counter 48 then equals the value previously in this counter when the strike was detected during the previous scan vectors. The counter or timer, not shown, in the CPU 10 or the display unit control 12 is started when the bench mark is detected at point A, and it continues to run until the point A′ is reached at which time it is stopped. The value of the counter is read out when the strike is detected at point Z. The total value of the counter represents the time it takes to traverse the line A, A′ and since the velocity of this generated line is known, the distance A, A′ can be calculated by the CPU 10. With this quantity A, A′ length of the line A, Z can be readily determined since the value in the synchronized counter at point Z was read out and stored in the CPU 10. If the length of the line A, Z is subtracted from the length of the line A, A′, the length of the line Z, A′ is thus determined. Since the slope of the line Z, A′ is known, the base Z, D of the triangle Z, A′, D can be calculated by the CPU 10. Since the length of the line Z, D is determined, the precise Y coordinate of the point Z may be obtained by subtracting from Y3 the length of the line Z, D or by adding to the reference coordinate Y2 the incremented quantity (Y3–Y2–length of the line Z, D). The precise X coordinate of the strike point Z is determined by subtracting from the reference coordinate X5 the incremental value represented by length of the line C, Z. The length of the line C, Z may be determined readily since the slope of the scan vector is known and the length of the line A, Z is known. Thus the precise X and the precise Y coordinate of the point Z is determined. By generating other scan vectors which cross the image 72 at other points, and determining the precise X and Y coordinates of such points by the technique explained above, the precise configuration of the image on the microfilm thus can be obtained.

It should be pointed out that other configurations of grid patterns may be employed, and different types of scanning techniques may be utilized using the principles of this invention. The foregoing is by way of illustration, not limitation.

Thus it is seen that a unique and novel arrangement is provided according to this invention for precisely determining the configuration of an image by utilizing a reference grid network in a CRT flying spot scanner. Furthermore, the precision obtained is free from errors produced by time variants inherent in analog deflection control circuits, high voltage power supplies, yoke constants and drift errors inherent in cathode ray tubes and their associated circuits. In the best design of prior art circuits the accuracy customarily varied between ±1%; whereas, in an arrangement according to this invention accuracies in the neighborhood of ±0.01% can be obtained.

While the invention has been particularly shown and described with reference to a preferred embodiment thereof, it will be understood by those skilled in the art that various changes in form and detail may be made therein without departing from the spirit and scope of the invention.

What is claimed is:

1. A device for performing precision reading of an image, said device including:

a cathode ray tube having a face and a light emitting coating disposed on the inner side of the face, a grid pattern disposed on the inner face of the light emitting coating, said cathode ray tube having an electron gun which generates an electron beam, deflection control means coupled to said cathode ray tube for positioning the electron beam on the face of the cathode ray tube thereby to project light from any place on the face of the cathode ray tube, a document disposed to be illuminated by light from the face of the cathode ray tube, said document having an image thereon, first light sensor means responsive to lights from the face of the cathode ray tube to indicate when said electron beam crosses any point on said grid pattern, and second light sensor means responsive to light from said document which indicates when a point on the image is detected whereby the location of the image may be determined precisely with respect to the grid lines.

2. The apparatus of claim 1 wherein the grid pattern includes strips of metallic material disposed on the inner face of the light emitting coating of the cathode ray tube.

3. The apparatus of claim 1 wherein the grid pattern is disposed between the glass face and the luminescent coating of the cathode ray tube.

4. The apparatus of claim 1 wherein the grid pattern is defined by extending portions of the luminescent material disposed on the inner face of the cathode ray tube.

5. The apparatus of claim 4 wherein the extended portions of the luminescent material lie in recessed areas of the inner face of the cathode ray tube.

6. A flying spot scanner for reading images including:

a cathode ray tube scanner, the cathode ray tube having a coating of luminescent material disposed on the inner face of the cathode ray tube, a grid network disposed on the inner face of the luminescent coating for modulating the illumination from the face of the cathode ray tube, a first light sensor responsive to the modulated illumination to indicate when the flying spot scanner crosses any point on the grid network, an image disposed to be illuminated by light from the face of the cathode ray tube scanner, a second light sensor responsive to light from said image, said second light sensor receiving light which is modulated by the grid network and the image, and means responsive to the first and second light sensors to define points on the image precisely with respect to the grid network.

7. The apparatus of claim 6 wherein the grid network includes strips of metallic material.

8. The apparatus of claim 6 wherein the grid network comprises protruding portions of the luminescent coating.

9. A flying spot scanner for reading images including:

a cathode ray tube scanner, the cathode ray tube having a coating of luminescent material disposed on the inner face of the cathode ray tube, a grid network disposed on the inner face of the luminescent coating for modulating the illumination from the face of the cathode ray tube, a first photomultiplier tube responsive to the modulated illumination to indicate when the flying spot scanner crosses any point on the grid network, an image disposed to be illuminated by light from the face of the cathode ray tube scanner, a second photomultiplier tube responsive to light from said image, said second photomultiplier tube receiving light which is modulated by the grid network and the image, and means responsive to the first and second photomultiplier tubes to define points on the image precisely with respect to the grid network.

10. The apparatus of claim 9 wherein the means includes a differential amplifier, means connecting the first and second photomultiplier tubes to the differential amplifier whereby the differential amplifier is operated to signify points on the image.

11. The apparatus of claim 9 wherein the grid network comprises protruding portions of the luminescent coating.

12. The apparatus of claim 10 wherein the first photomultiplier is connected also to a counter for keeping track of grid crossings by the flying spot scanner.

References Cited

UNITED STATES PATENTS

| | | | |
|---|---|---|---|
| 3,175,089 | 3/1965 | Talley et al. | 178—6.8X |
| 3,274,421 | 9/1966 | Johnson | 178—7.84X |
| 3,356,881 | 12/1967 | Yaggy | 178—7.83X |
| 3,395,305 | 7/1968 | Yaggy | 178—7.83X |
| 3,450,934 | 6/1969 | Frenk | 178—6.8X |

MAYNARD R. WILBUR, Primary Examiner

L. H. BOUDREAU, Assistant Examiner

U.S. Cl. X.R.

178—6.8, 7.7; 250—217, 219